(12) United States Patent
Rooney

(10) Patent No.: US 12,488,824 B2
(45) Date of Patent: Dec. 2, 2025

(54) MEMORY WITH DETERMINISTIC WORST-CASE ROW ADDRESS SERVICING, AND ASSOCIATED SYSTEMS, DEVICES, AND METHODS

(71) Applicant: Micron Technology, Inc., Boise, ID (US)

(72) Inventor: Randall J. Rooney, Boise, ID (US)

(73) Assignee: Micron Technology, Inc., Boise, ID (US)

(*) Notice: Subject to any disclaimer, the term of this patent is extended or adjusted under 35 U.S.C. 154(b) by 197 days.

(21) Appl. No.: 18/232,706

(22) Filed: Aug. 10, 2023

(65) Prior Publication Data

US 2024/0112717 A1 Apr. 4, 2024

Related U.S. Application Data

(60) Provisional application No. 63/412,814, filed on Oct. 3, 2022.

(51) Int. Cl.
*G11C 11/406* (2006.01)
*G11C 11/408* (2006.01)

(52) U.S. Cl.
CPC .......... *G11C 11/406* (2013.01); *G11C 11/408* (2013.01)

(58) Field of Classification Search
CPC ............... G11C 11/406; G11C 11/408; G11C 11/40611; G11C 29/18

USPC .......................................................... 365/222
See application file for complete search history.

(56) References Cited

U.S. PATENT DOCUMENTS

| | | | | |
|---|---|---|---|---|
| 9,224,450 B2 * | 12/2015 | Cordero | ................ | G11C 11/406 |
| 9,589,606 B2 * | 3/2017 | Lin | ................ | G06F 13/1636 |
| 10,446,216 B2 * | 10/2019 | Oh | ................ | G11C 11/4076 |
| 11,195,568 B1 * | 12/2021 | Atishay | ................ | G11C 29/42 |
| 2022/0165347 A1 * | 5/2022 | Pan | ................ | G11C 7/24 |

\* cited by examiner

*Primary Examiner* — Fernando Hidalgo
(74) *Attorney, Agent, or Firm* — Dorsey & Whitney LLP

(57) ABSTRACT

Memory with deterministic worst-case row address servicing is disclosed herein. A method of the present technology comprises (1) updating a counter value corresponding to a memory row of a memory device in response to detecting activation of the memory row; (2) comparing the updated counter value to a worst-case count value; and (3) in response to determining that the updated counter value is greater than the worst-case count value, setting the worst-case count value equal to the updated counter value and storing a memory row address of the memory row as a worst-case memory row address. The counter value can be one of a plurality of counter values, each counter value (a) corresponding to a respective memory row and (b) configured to track a number of activations of the respective memory row. The method can further comprise performing a row disturb refresh operation using the worst-case memory row address.

20 Claims, 5 Drawing Sheets

MEMORY WITH DETERMINISTIC WORST-CASE ROW ADDRESS SERVICING, AND ASSOCIATED SYSTEMS, DEVICES, AND METHODS

CROSS-REFERENCE TO RELATED APPLICATION(S)

The present application claims priority to U.S. Provisional Patent Application No. 63/412,814, filed Oct. 3, 2022, the disclosure of which is incorporated herein by reference in its entirety.

TECHNICAL FIELD

The present disclosure is related to memory systems, devices, and associated methods. For example, several embodiments of the present disclosure are directed to memory systems and devices with deterministic worst-case row address servicing.

BACKGROUND

Memory devices are widely used to store information related to various electronic devices such as computers, wireless communication devices, cameras, digital displays, and the like. Memory devices are frequently provided as internal, integrated circuits and/or as part of external removable devices in computers or other electronic devices. There are many different types of memory, including volatile and non-volatile memory. Volatile memory, including static random-access memory (SRAM), dynamic random-access memory (DRAM), and synchronous dynamic random-access memory (SDRAM), among others, may require a source of applied power to maintain its data. Non-volatile memory, by contrast, can retain its stored data even when not externally powered. Non-volatile memory is available in a wide variety of technologies, including flash memory (e.g., NAND and NOR) phase change memory (PCM), ferroelectric random-access memory (FeRAM), resistive random-access memory (RRAM), and magnetic random-access memory (MRAM), among others. Improving memory devices, generally, may include increasing memory cell density, increasing performance (e.g., read, write, erase speeds) or otherwise reducing operational latency, increasing reliability, increasing data retention, reducing power consumption, reducing manufacturing costs, or reducing dimensional attributes, among other metrics.

BRIEF DESCRIPTION OF THE DRAWINGS

The present disclosure will be understood more fully from the detailed description given below and from the accompanying drawings of various embodiments of the present disclosure. The components in the drawings are not necessarily to scale. Instead, emphasis is placed on illustrating clearly the principles of the present technology. The drawings should not be taken to limit the disclosure to the specific embodiments depicted, but are for explanation and understanding only.

DETAILED DESCRIPTION

Figure 1A:
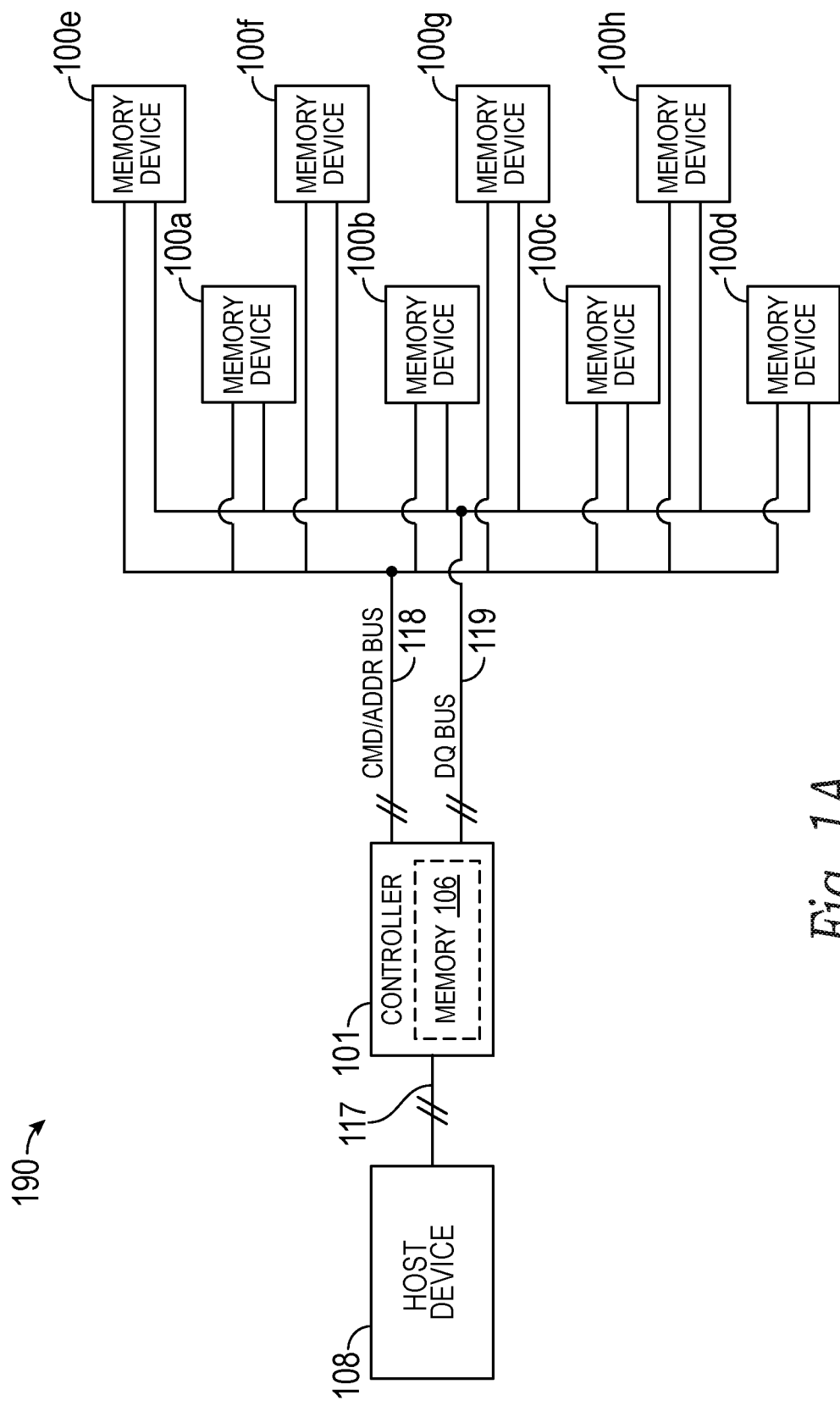
FIG. 1A is a block diagram schematically illustrating a memory system configured in accordance with various embodiments of the present technology.

As discussed in greater detail below, the technology disclosed herein relates to memory systems and devices having refresh control circuitry that employ deterministic row disturb mitigation solutions. For example, a memory device of the present technology can include refresh control circuitry that is configured to update a counter value corresponding to a memory row of the memory device in response to detecting that the memory row has been activated or accessed. After updating the counter value, the refresh control circuitry can compare the counter value to a worst-case count value stored to a worst-case count register of the refresh control circuitry. When the updated counter value is greater than the worst-case count value, the refresh control circuitry can (a) replace the worst-case count value with the updated counter value and (b) store a memory row address of the memory row as a worst-case memory row address. On the other hand, when the updated counter value is less than the worst-case count value, the refresh control circuitry can retain the worst-case count value. This process can be repeated for each activation or access of memory rows of the memory device until the memory device enters a row disturb refresh service event interval. When the memory device enters a row disturb refresh service event interval, the memory device can use the current worst-case memory row address to identify one or more memory rows on which to perform row disturb refresh operations. A person skilled in the art will understand that the technology may have additional embodiments and that the technology may be practiced without several of the details of the embodiments described below with reference to FIGS. 1A-4.

In the illustrated embodiments below, the memory devices and systems are primarily described in the context of devices incorporating DRAM storage media. Memory devices configured in accordance with other embodiments of the present technology, however, can include other types of memory devices and systems incorporating other types of storage media, including PCM, SRAM, FRAM, RRAM, MRAM, read only memory (ROM), erasable programmable ROM (EPROM), electrically erasable programmable ROM (EEROM), ferroelectric, magnetoresistive, and other storage media, including non-volatile (e.g., flash, NAND and/or NOR) storage media.

A. Overview

Securing data can include preventing unauthorized access to memory cells in which the data is stored and/or improving retention (e.g., reliability) of the data stored in the memory cells. Data stored in memory can become unreliable (e.g., corrupted, lost) due to various factors. For example, charge leakage from memory cells can result in a loss of the data stored to the memory cells. Therefore, various memory cells (e.g., volatile memory cells) can be periodically refreshed at a particular rate to retain stored data values.

As another example, certain patterns of activating or accessing memory rows of memory cells may increase the rate at which information stored in memory decays. As a specific example, repeated access to a given memory row (an aggressor memory row) can increase the rate at which information decays in neighboring memory rows (victim memory rows). Various other attacks are also possible, which may cause an increased rate of data degradation in the victims of the attack. In some circumstances, an attack may be inadvertent, and may be caused by a controller accessing the memory in a manner that causes an increased rate of information decay in some memory cells. In other circumstances, a malicious or nefarious actor may deliberately employ row toggle or row disturb attacks in an effort to gain access to data stored in memory and/or to intentionally alter the data stored in memory (e.g., by repeatedly accessing a particular row in rapid succession in an attempt to corrupt data stored to neighboring memory rows). Refreshing memory cells of the neighboring memory rows at a faster rate (e.g., during the row disturb attacks and/or using row disturb refresh service events) can improve or maintain the reliability of data stored to memory cells of the neighboring memory rows (e.g., by reducing the row disturb effects). But refreshing memory cells at a faster rate increases the amount of power consumed by the memory device. In addition, repeatedly performing row disturb refresh management service events on a victim memory row can turn that memory row into an aggressor and introduce row disturb loss on memory rows neighboring the victim-turned-aggressor memory row.

To address these concerns, many memory devices probabilistically add memory row addresses to a queue or content-addressable memory (CAM) for servicing (e.g., for refreshing of adjacent rows) during row disturb refresh events when the memory row addresses are repeatedly accessed a number of times. Memory devices employing deterministic row disturb mitigation techniques often include counters to track the numbers of times memory rows are accessed, and counts maintained by the counters are commonly compared to threshold levels to identify memory rows that should be added to the queues or CAMs. The queues or CAMs are typically configured to store several memory row addresses at a time such that the memory rows are able to track several memory rows for servicing at once. But as the depth of the queues or CAMs increases, identifying a worst-case memory row address (e.g., a memory row address having adjacent memory rows in most need of servicing) in the queues or CAMS becomes more cumbersome (e.g., complex, slow, etc.). In addition, reliance on comparisons of the counts maintained by the counters to threshold levels can leave the corresponding memory device susceptible to attacks, such as waterfall attacks that attempt to (a) push the counts to the threshold levels minus one and (b) then overflow all of the counts to or beyond the threshold levels at once or within a short amount of time to overwhelm row disturb mitigation circuitry of the memory devices and drive activation counts of a few of the memory rows higher in an attempt to corrupt data stored to adjacent memory rows.

In contrast, the present technology is directed to memory devices and systems having refresh control circuitry including (a) counters to maintain counter values that each represent a number of times a memory row corresponding to a respective counter is accessed or activated, (b) a worst-case count register configured to store a (e.g., only one, a single, etc.) worst-case count value, and (c) a worst-case memory row address register configured to store a memory row address of a memory row corresponding to the worst-case count value. The memory address stored to the worst-case memory row address register is referred to herein as a worst-case memory row address. The refresh control circuitry can further include comparator circuitry configured to perform (a) comparisons between the counter values and the worst-case count value, (b) comparisons between the worst-case count value and one or more threshold counts levels, and/or (c) comparisons between durations of time memory rows remain activated and one or more threshold durations of time.

When a memory row of a memory device of the present technology is activated or accessed, a counter of the refresh control circuitry that corresponds to the memory row can update (e.g., increment) a corresponding counter value to reflect the access or activation. In some embodiments, the counter can update the corresponding counter value by a first amount (e.g., one) each time the memory row is activated or accessed regardless of a duration of time the memory row remains activated or accessed. In other embodiments, the counter can update the corresponding counter value by (a) a first amount (e.g., one) when the memory row is activated or accessed and remains activated or accessed for less than a threshold duration of time and/or (b) a second amount (e.g., two or more) when the memory row remains activated or accessed for greater than the threshold duration of time.

After updating the corresponding counter value, the refresh control circuitry can then compare the corresponding counter value to a current worst-case count value stored to the worst-case count register. When the corresponding counter value is less than the current worst-case count value, the refresh control circuitry can retain the current worst-case count value in the worst-case count register. On the other hand, when the corresponding counter value is greater than the current worst-case count value, the refresh control circuitry can replace the current worst-case count value with the corresponding counter value by storing the corresponding counter value in the worst-case count register as a new worst-case count value. In addition, the refresh control circuitry can store a memory row address corresponding to the memory row as a worst-case memory row address in the worst-case memory row address register.

When the memory device enters a row disturb refresh (RDR) service event interval, the refresh control circuitry can identify, based at least in part on the worst-case memory row address, one or more memory row addresses corresponding to memory rows neighboring (e.g., positioned physically or logically adjacent to, such as immediately adjacent to or within a threshold number of memory rows in one or more directions from) the memory row referenced by the worst-case memory row address. The one or more memory row addresses identified by the refresh control circuitry can then be used by the memory device to refresh (e.g., perform RDR service events on) the neighboring memory rows. In some embodiments, the memory device refreshes the neighboring memory rows regardless of a magnitude of the worst-case count value stored to the worst-case count register. In other embodiments, the memory device refreshes the neighboring memory rows only when the magnitude of the worst-case count value at the timing of the RDR service event interval exceeds a threshold count level. After refreshing the neighboring rows, the refresh control circuitry can (a) reset the worst-case count value stored in the worst-case count register to a first default value, (b) reset the worst-case memory row address stored in the worst-case memory row address register to a second default value or a default memory row address, (c) reset the counter value maintained by a counter of the refresh control circuitry and corresponding to the worst-case count value to a third default value, or (d) any combination thereof.

In this manner, the present technology offers a deterministic row disturb mitigation solution with several advantages over deterministic techniques employed in many memory devices. For example, because several memory devices of the present technology are configured to track and store a single worst-case count value and a single worst-case memory row address at a time, the present technology is expected to reduce the computational overhead and burden of identifying a worst-case aggressor memory row for RDR service events, in comparison to other deterministic row disturb mitigation techniques that employ queues or CAMs of a plurality of memory row addresses for RDR service events. In turn, the present technology is expected to more quickly identify a worst-case aggressor memory row in comparison to the other deterministic row disturb mitigation techniques.

As another example, because several memory devices of the present technology do not rely on comparisons of activation counts to fixed threshold levels to identify memory row addresses for RDR service events, the memory devices of the present technology are expected to be less susceptible to attacks (e.g., waterfall attacks) and/or may obviate use of Ready/Wait and/or other protocols that are often employed to mitigate the effects of such attacks. Additionally, or alternatively, because memory devices in some embodiments of the present technology are configured to perform RDR service events only when a magnitude of a worst-case count is beyond a threshold count level, these memory devices are expected to perform fewer RDR service events (e.g., are expected to reduce RDR steal frequency), thereby consuming less power in comparison to memory devices that employ other row disturb mitigation techniques.

B. Selected Embodiments of Memory with Deterministic Worst-Case Row Address Servicing, and Associated Systems, Devices, and Methods FIG. 1A is a block diagram schematically illustrating a memory system 190 (e.g., a dual in-line memory module (DIMM)) configured in accordance with various embodiments of the present technology. In the illustrated embodiment, the memory system 190 includes a plurality of memory devices 100 (identified individually as memory devices 100a-100h in FIG. 1A), a host device 101 (hereinafter referred to as a "memory controller 101"), and a host device 108. In some embodiments, the memory devices 100 can be DRAM memory devices. Although illustrated with eight memory devices 100 in FIG. 1A, the memory system 190 can include a greater or lesser number of memory devices 100 in other embodiments of the present technology. Well-known components of the memory system 190 have been omitted from FIG. 1A and are not described in detail below so as to avoid unnecessarily obscuring aspects of the present technology.

The memory devices 100 can be connected to one or more electronic devices that are capable of utilizing memory for temporary or persistent storage of information, or a component thereof. For example, one or more of the memory devices 100 can be operably connected to one or more host devices. In the specific example illustrated in FIG. 1A, the memory devices 100 of the memory system 190 are connected to the memory controller 101 and to the host device 108. More specifically, the memory devices 100 of FIG. 1A are operably connected to the memory controller 101 via a command/address (CMD/ADDR) bus 118 and a data (DQ) bus 119. As described in greater detail below with respect to FIG. 1B, the CMD/ADDR bus 118 and the DQ bus 119 can be used by the memory controller 101 to communicate commands, memory addresses, and/or data to the memory devices 100. In response, the memory devices 100 can execute commands received from the memory controller 101. For example, in the event a write command is received from the memory controller 101 over the CMD/ADDR bus 118, the memory devices 100 can receive data from the memory controller 101 over the data DQ bus 119 and can write the data to memory cells corresponding to memory addresses received from the memory controller 101 over the CMD/ADDR bus 118. As another example, in the event a read command is received from the memory controller 101 over the CMD/ADDR bus 118, the memory devices 100 can output data to the memory controller 101 over the data DQ bus 119 from memory cells corresponding to memory addresses received from the memory controller 101 over the CMD/ADDR bus 118.

In the illustrated example, the memory controller 101 includes a memory 106 configured to store various processes, logic flows, and routines for controlling operation of the memory system 190, including managing the memory devices 100 and handling communications between the memory devices 100 and the host device 108. In some embodiments, the memory 106 can include memory registers storing, for example, memory pointers, fetched data, etc. The memory 106 can also include read-only memory (ROM) or other non-volatile memory, and/or volatile memory (e.g., SRAM). Although shown embedded in the memory controller 101 in FIG. 1A, the memory 106 can be positioned at other locations in the memory system 190 in other embodiments of the present technology, such as exterior the memory controller 101, the host device 108, and/or one or more of the memory devices 100a-100h.

The host device 108 of FIG. 1A may be a computing device such as a desktop or portable computer, a server, a hand-held device (e.g., a mobile phone, a tablet, a digital reader, a digital media player), or some component thereof (e.g., a central processing unit, a co-processor, a dedicated memory controller, etc.). The host device 108 may be a networking device (e.g., a switch, a router, etc.); a recorder of digital images, audio, and/or video; a vehicle; an appliance; a toy; or any one of a number of other products. In one embodiment, the host device 108 may be connected directly to one or more of the memory devices 100 (e.g., via a communications bus of signal traces (not shown)). Additionally, or alternatively, the host device 108 may be indirectly connected to one or more of the memory devices 100 (e.g., over a networked connection or through intermediary devices, such as through the memory controller 101 and/or via a communications bus 117 of signal traces).

Figure 1B:
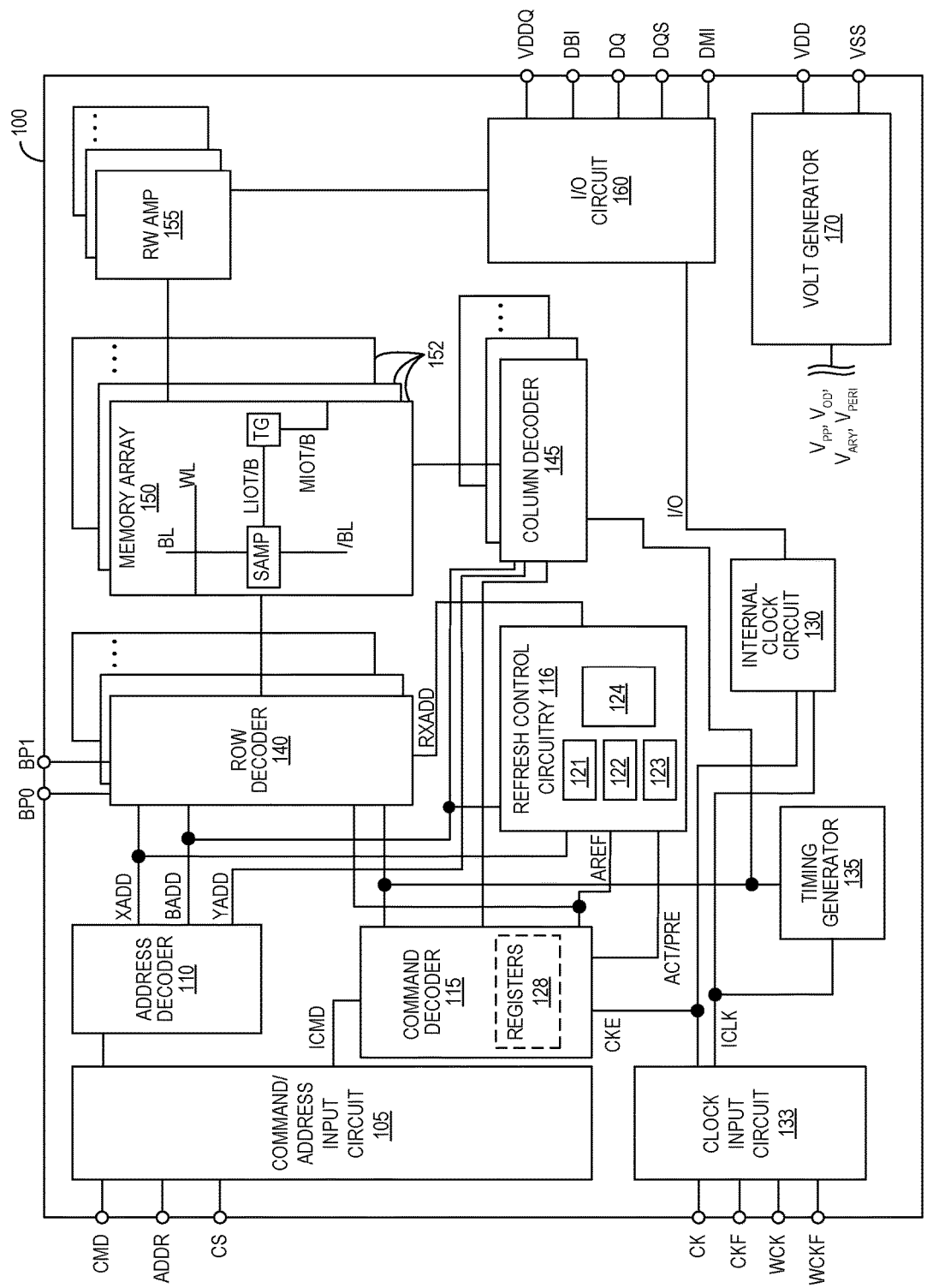
FIG. 1B is a block diagram schematically illustrating a memory device configured in accordance with various embodiments of the present technology.

FIG. 1B is a block diagram schematically illustrating a memory device 100 configured in accordance with various embodiments of the present technology. The memory device 100 may include an array of memory cells, such as memory array 150. The memory array 150 may include a plurality of memory banks 152 (e.g., four banks, eight banks, sixteen banks, thirty-two banks, or any other number of memory banks), and each memory bank 152 may include a plurality of word lines (WL), a plurality of bit lines (BL), and a plurality of memory cells (e.g., m×n memory cells) arranged at intersections of the word lines (e.g., m word lines, which may also be referred to as memory rows) and the bit lines (e.g., n bit lines, which may also be referred to as memory columns). Memory cells can include any one of a number of different memory media types, including capacitive, phase change, magnetoresistive, ferroelectric, or the like.

Each word line WL of the plurality may be coupled with a corresponding word line driver configured to control a voltage of the word line during memory operations. The selection of a word line WL may be performed by a row decoder 140, and the selection of a bit line BL (and/or a bit line/BL) may be performed by a column decoder 145. In the illustrated embodiment, the row decoder 140 includes a respective row decoder for each memory bank 152, and the column decoder 145 includes a respective column decoder for each memory bank 152.

Sense amplifiers (SAMP) may be provided for corresponding bit lines BL and/BL, and can be connected to at least one respective local I/O line pair (LIOT/B) that, in turn, can be coupled to at least one respective main I/O line pair (MIOT/B) via transfer gates (TG) that can function as switches. Read data from the bit line BL or the bit line/BL is amplified by the sense amplifier SAMP, and transferred to read/write amplifiers 155 over the local I/O line pair, the transfer gates TG, and the main I/O line pair MIOT/B. Write data output from the read/write amplifiers 155 is transferred to the sense amplifier SAMP over the main I/O line pair MIOT/B, the transfer gates TG, and the local I/O line pair LIOT/B, and thereafter written in or stored to a memory cell coupled to the bit line BL or the bit line/BL.

The memory device 100 may employ a plurality of external terminals that include command and address terminals coupled to a command/address bus (e.g., the CMD/ADDR bus 118 of FIG. 1A) to receive command signals CMD and address signals ADDR, respectively. The memory device may further include a chip select terminal to receive a chip select signal CS; clock terminals to receive clock signals CK and/or CKF; data clock terminals to receive data clock signals WCK, WCKF, and/or DQS; data terminals DQ, DBI (for data bus inversion function), and/or DMI (for data mask inversion function); and/or power supply terminals VDD, VSS, VDDQ, and/or VSSQ (not shown).

The power supply terminals may be supplied with power supply potentials VDD and VSS. These power supply potentials VDD and VSS can be supplied to an internal voltage generator circuit 170. The internal voltage generator circuit 170 can generate various internal potentials VPP, VOD, VARY, VPERI, and the like based on the power supply potentials VDD and VSS. The internal potential VPP can be used in the row decoder 140, the internal potentials VOD and VARY can be used in the sense amplifiers included in the memory array 150, and the internal potential VPERI can be used in various circuit blocks of the memory device 100.

The power supply terminals may also be supplied with power supply potentials VDDQ and/or VSSQ (not shown). The power supply potentials VDDQ and VSSQ can be supplied to an input/output circuit 160 together with the power supply potentials VDD and VSS. The power supply potentials VDDQ and VSSQ can be the same potentials as the power supply potentials VDD and VSS, respectively, in some embodiments of the present technology. The power supply potentials VDDQ and VSSQ can be different potentials from the power supply potentials VDD and VSS, respectively, in other embodiments of the present technology. The power supply potentials VDDQ and VSSQ can be used for the input/output circuit 160 so that power supply noise generated by the input/output circuit 160 does not propagate to the other circuit blocks of the memory device 100.

The external clock signals CK and CKF received at the clock terminals and/or the external data clock signals WCK and WCKF received at the data clock terminals can be supplied to a clock input circuit 133. For example, when enabled by a clock enable signal CKE, input buffers included in the clock input circuit 133 can receive the clock signals CK and CKF and/or the data clock signals WCK and WCKF. The CK and CKF signals can be complementary, and/or the WCK and WCKF signals can be complementary.

The clock input circuit 133 can generate an internal clock signal ICLK based on the clock signals CK, CKF, WCK, and/or WCKF. The internal clock signal ICLK signal can be supplied to an internal clock circuit 130. In turn, the internal clock circuit 130 can provide various phase and frequency controlled internal clock signals based on the internal clock signals ICLK and/or the clock enable signal CKE. The phase and frequency controlled internal clock signals can be used for timing operation of various internal circuits of the memory device 100. For example, the internal clock circuit 130 can provide input/output clock signals I/O to the input/output circuit 160 of the memory device 100. The input/output clock signals I/O can be used as timing signals for determining an output timing of read data and/or an input timing of write data. The input/output clock signals I/O can be provided at multiple clock frequencies so that data can be output from and/or input into the memory device 100 at different data rates. A higher clock frequency may be desirable when high memory speed is desired. A lower clock frequency may be desirable when lower power consumption is desired. The internal clock signals ICLK can additionally or alternatively be supplied to a timing generator 135 (e.g., to generate various internal clock signals) and/or to a command decoder 115.

The command/address terminals may be supplied with addresses signals ADDR from outside the memory device 100 (e.g., from a memory controller). The address signals ADDR supplied to the address terminals can be transferred, via the command/address input circuit 105, to an address decoder 110. The address decoder 110 can receive the address signals ADDR and supply a decoded row address signal (XADD) to the row decoder 140, and a decoded column address signal (YADD) to the column decoder 145. The address decoder 110 can also supply a decoded bank address signal (BADD) to the row decoder 140 and to the column decoder 145. The decoded bank address signal (BADD) can specify a memory bank 152 of the memory array 150 containing the decoded row address XADD and the decoded column address YADD. As discussed in greater detail below, the address decoder 110 can also supply the decoded row address signal (XADD) and the decoded bank address signal (BADD) to refresh control circuitry 116 of the memory device 100.

The command/address terminals of the memory device 100 may further be supplied with command signals CMD and/or chip select signals CS from outside the memory device 100. The command signals may represent various memory commands (e.g., refresh commands; refresh management commands; activate commands ACT; precharge commands PRE; access commands, such as read commands and write commands; timing commands; etc.) from a memory controller. The access commands may be associated with one or more row addresses XADD, column addresses YADD, and bank addresses BADD to indicate which memory cells of the memory array 150 to access. The chip select signal CS may be used to select the memory device 100 to respond to commands and addresses provided to the command and address terminals of the memory device 100. When an active CS signal is provided to the memory device 100, the commands and addresses can be decoded and memory operations can be performed. When the CS signal is not active, the memory device 100 can ignore commands and/or addresses provided to the command and address terminals.

The command signals CMD received at the command terminals may be supplied to the command decoder 115, via the command/address input circuit 105, as internal command signals ICMD. The command decoder 115 can include circuits to decode the internal command signals ICMD and generate various internal signals and commands for performing memory operations. For example, the command decoder 115 can provide a row command signal to select a word line and a column command signal to select a bit line (e.g., in response to receiving an access command). Other examples of memory operations that the memory device 100 may perform based on decoding the internal command signals ICMD include refresh commands (e.g., re-establishing full charges stored in individual memory cells of the memory array 150), activate commands ACT (e.g., activating a row in a particular memory bank 152, in some cases for subsequent access operations), or precharge commands PRE (e.g., deactivating the activated row in the particular memory bank 152).

The command decoder 115, in some embodiments, may further include one or more registers 128 for tracking various counts and/or values (e.g., counts of refresh commands received by the memory device 100 or self-refresh operations performed by the memory device 100) and/or for storing various operating conditions for the memory device 100 to perform certain functions, features, and modes (or test modes). As such, in some embodiments, the registers 128 (or a subset of the registers 128) may be referred to as mode registers. Additionally, or alternatively, the memory device 100 may include registers 128 as a separate component outside of the command decoder 115. In some embodiments, the registers 128 may include multi-purpose registers (MPRs) configured to write and/or read specialized data to and/or from the memory device 100.

When a read command is issued to a memory bank 152 with an open row and a column address is timely supplied as part of the read command, read data can be read from memory cells in the memory array 150 designated by the row address (which may have been provided as part of the activate command ACT identifying the open row) and the column address. The read command may be received by the command decoder 115, which can provide internal commands so that read data from the memory array 150 is output from the memory device 100 via the read/write amplifiers 155 and the input/output circuit 160, using the data terminals DQ, DBI, and/or DMI, and/or according to the DQS clock signal. The read data may be provided at a time defined by read latency information that can be programmed in the memory device 100, for example, in a mode register (e.g., one or more of the registers 128). The read latency information can be defined in terms of clock cycles of the CK clock signal. For example, the read latency information can be a number of clock cycles of the CK signal after the read command is received by the memory device 100 when the associated read data is provided.

When a write command is issued to a memory bank 152 with an open row and a column address is timely supplied as part of the write command, write data can be supplied to the data terminals DQ, DBI, and/or DMI. The write data can be supplied to the data terminals DQ, DMI, and/or DMI according to the WCK and WCKF clock signals. The write command may be received by the command decoder 115, which can provide internal commands to the input/output circuit 160 so that the write data can be received by data receivers in the input/output circuit 160, and supplied to the memory array 150 via the read/write amplifiers 155. The write data may be written in the memory cell designated by the row address and the column address. The write data may be provided to the data terminals at a time that is defined by write latency WL information. The write latency WL information can be programmed in the memory device 100, for example, in a mode register (e.g., one or more of the registers 128). The write latency WL information can be defined in terms of clock cycles of the CK clock signal. For example, the write latency information WL can be a number of clock cycles of the CK signal after the write command is received by the memory device 100 when the associated write data is received.

As shown, the memory device 200 further includes refresh control circuitry 116 to manage refresh operations performed on memory cells of the memory array 150. The refresh control circuitry 116 includes a plurality of counter circuits 121 ("counters 121"), a worst-case memory row counter value register 122 ("worst-case count register 122"), a worst-case memory row address register 123 ("worst-case address register 123"), and comparator circuitry 124 ("comparator(s) 124"). The counters 121 can include a counter 121 per memory row of the memory array 150. Each of the counters 121 can store and/or update a counter value representing (a) a number of times a corresponding memory row of the memory array 150 is activated and/or accessed, (b) a duration the corresponding memory row is held activated, or (c) a combination thereof. The worst-case count register 122 can store a (e.g., only one, a single, etc.) worst-case counter value ("worst-case count"), and the worst-case address register 123 can store a (e.g., only one, a single, etc.) memory row address of a memory row corresponding to the worst-case count. The memory address of the memory row corresponding to the worst-case count is referred to herein as "a worst-case memory row address."

Figure 2:
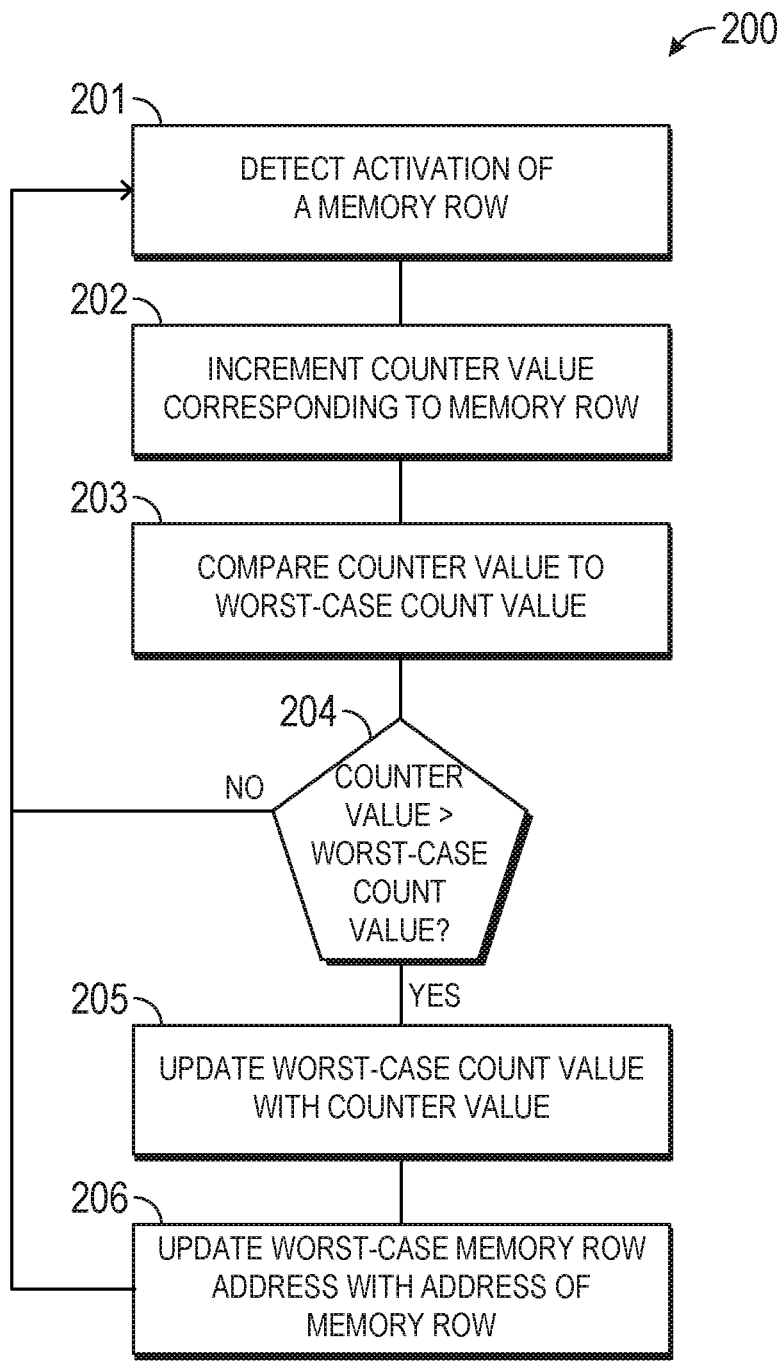
FIG. 2 is a flow diagram illustrating a method of operating a memory device in accordance with various embodiments of the present technology.

Although illustrated as part of the refresh control circuitry 116 in FIG. 2, the counters 121, the worst-case count register 122, the worst-case address register 123, and/or the comparator(s) 124 can be positioned at other locations within the memory device 100 in other embodiments. For example, one or more of these components can be positioned in the row decoder 140, in the command decoder 115, in the memory array 150, and/or as standalone components in the memory device 100. Additionally, or alternatively, although described as including a counter 121 per memory row of the memory array 150, the memory device 100 can include a counter 121 per group of memory rows (e.g., per memory region or per memory bank). Furthermore, in some embodiments of the present technology, the refresh control circuitry 116 can include multiple worst-case count registers 122 and/or multiple worst-case address registers 123. The worst-case count registers 122 can store multiple worst-case counts, and the worst-case address registers 123 can store multiple memory row addresses of memory rows corresponding to the one or more worst-case counts.

The refresh control circuitry 116 of FIG. 2 is configured to receive a row address signal XADD and a bank address signal BADD from the address decoder 110. In addition, the refresh control circuitry 116 is configured to receive an auto-refresh signal AREF, an indication of activate commands ACT, and/or an indication of precharge commands PRE from the command decoder 115. In some embodiments, when an activate command ACT is issued to activate a memory row of the memory array 150, the refresh control circuitry 116 can detect the activation of the memory row based at least in part on (a) the indication of the activate command ACT received from the command decoder 115 and (b) the row address signal XADD and the bank address signal BADD received from the address decoder 110. As discussed in greater detail below with reference to FIGS. 2 and 3, the refresh control circuitry 116 can, in turn, increment a counter value corresponding to the memory row referenced by the row address signal XADD and the bank address signal BADD. In some embodiments, the refresh control circuitry 116 can (using a corresponding one of the counters 121) increment the counter value by one (or another value) each time the corresponding memory row is activated and/or accessed. In these and other embodiments, the refresh control circuitry 116 can increment the counter value by an amount greater than one (or an amount greater than the other value) when the corresponding memory row remains activated for a prolonged period of time. For example, the refresh control circuitry 116 can determine an amount of time that a memory row remains activated (e.g., by determining an amount of time between (i) receiving the indication of the active command ACT from the command decoder 115 and (ii) receiving a subsequent indication of a precharge command PRE from the command decoder 115). When the amount of time that the memory row remains activated exceeds a threshold amount of time, the refresh control circuitry 116 (using the corresponding counter 121) can update the counter value corresponding to that memory row by an amount greater than one (or an amount greater than the other value). In some embodiments, to determine whether the amount of time the memory row remains activated exceeds the threshold amount of time, the refresh control circuitry 116 can compare (using the comparator(s) 124) the amount of time the memory row remains activated to the threshold amount of time.

When a counter value corresponding to a memory row of the memory array 150 is incremented by a counter 121 of the refresh control circuitry 116 (e.g., in response to activation of the corresponding memory row), the refresh control circuitry 116 can compare (using the comparator 124) the incremented counter value to a current worst-case count stored by the worst-case count register 122. In the event that the incremented counter value is greater than the current worst-case count stored by the worst-case count register 122, the refresh control circuitry 116 can replace the current worst-case count stored in the worst-case count register 122 with the incremented counter value such that the incremented counter value serves as a new worst-case count. In addition, the refresh control circuitry 116 can store a memory address (e.g., the row address signal XADD) of the memory row corresponding to the incremented counter value to the worst-case address register 123 as a new worst-case memory row address. Thus, when the refresh control circuitry 116 subsequently receives an indication of an auto-refresh command AREF from the command decoder, the refresh control circuitry 116 can use the worst-case memory row address to identify one or more victim memory rows upon which to perform a row disturb refresh (RDR) service event (also referred to herein as a "targeted refresh").

A general discussion of refresh operations of the memory device 100 is now provided for the sake of clarity and understanding. The memory device 100 can receive commands instructing the memory device 100 to perform one or more refresh operations. For example, the memory device 100 can be periodically placed into a refresh mode by programming one or more of the registers 128 of the command decoder 115 and/or using a refresh entry mode command, and the memory device 100 can periodically perform refresh operations each time the memory device is placed in the refresh mode. In some embodiments, the refresh entry mode command can be periodically generated internally by an internal component of the memory device 100. In these and other embodiments, the refresh entry mode command can be externally supplied to the memory device 100. When a refresh entry mode command is externally supplied to the memory device 100, the command decoder 115 can activate (e.g., assert, pulse) an auto-refresh signal AREF. The command decoder 115 can activate the auto-refresh signal AREF once in response to receiving a refresh entry mode command, and thereafter can cyclically activate the auto-refresh signal AREF at a desired timing or cadence (e.g., until an auto-refresh operation is complete or until the refresh entry mode command times out). The auto-refresh signal AREF can be used to control timing of refresh operations performed by the memory device 100 while the memory device 100 is in a refresh mode.

In some embodiments, a self-refresh signal (not shown) can be used in addition to or in lieu of the auto-refresh signal AREF. For example, the command decoder 115 can activate a self-refresh signal in response to the memory device 100 entering into a self-refresh mode, and thereafter can cyclically activate the self-refresh signal at a desired timing or cadence until the memory device 100 exits the self-refresh mode (e.g., in response to receiving a self-refresh exit command).

As discussed above, the command decoder 115 supplies the auto-refresh signal AREF to the refresh control circuitry 116 of the memory device 100. In turn, the refresh control circuitry 116 supplies a refresh row address RXADD to the row decoder 140 to refresh one or more wordlines WL (memory rows) indicated by the refresh row address RXADD. In some embodiments, the refresh address RXADD can represent a single wordline. In these and other embodiments, the refresh address RXADD can represent multiple wordlines that can be refreshed sequentially or simultaneously by the row decoder 140. In some embodiments, the number of wordlines represented by the refresh address RXADD can vary from one refresh to another. The refresh control circuitry 116 can control a timing of the refresh operation.

A refresh address RXADD output by the refresh control circuitry 116 can be an auto-refresh address (e.g., taken from a sequence of auto-refresh addresses) or a targeted refresh address (e.g., a refresh address that specifies one or more victim memory row addresses corresponding to an identified aggressor memory row address). The identified aggressor memory row address can be the worst-case memory row address currently stored in the worst-case address register 123 of the refresh control circuitry 116 when the refresh control circuitry 116 receives an activated refresh signal AREF from the command decoder 115. In this manner, the memory device 100 can therefore perform an auto-refresh operation when the refresh address RXADD output by the refresh control circuitry 116 corresponds to an auto-refresh address, and can perform a targeted refresh when the refresh address RXADD output by the refresh control circuitry 116 corresponds to a targeted refresh address.

The auto-refresh addresses output by the refresh control circuitry 116 can correspond to a sequence of memory addresses that the refresh control circuitry 116 can step through based on activations of the refresh signal AREF. Thus, the refresh control circuitry 116 can cycle through the sequence of auto-refresh addresses at a rate determined by assertion of the refresh signal AREF. In some embodiments, the memory device 100 can perform auto-refresh operations at a high enough frequency such that no information stored to a wordline is expected to degrade in the time between consecutive auto-refresh operations performed on that wordline. In other words, the memory device 100 can be configured to perform auto-refresh operations such that each wordline is refreshed at a rate faster than the expected rate of information decay.

The refresh control circuitry 116 can also determine targeted refresh addresses that correspond to memory rows (e.g., victim memory rows) that require refreshing based on the access pattern of a nearby or neighboring memory row (e.g., an aggressor memory row) in the memory array 150. As discussed above, the refresh control circuitry 116 may use one or more signals of the memory device 100 to calculate targeted refresh addresses for the refresh address RXADD. For example, targeted refresh addresses may be a calculated based on (a) the row addresses XADD and/or the bank addresses BADD provided by the address decoder 110 and (b) indications received from the command decoder 115 regarding activate commands ACT, precharge commands PRE, and/or access commands. In some embodiments, the refresh control circuitry 116 may sample the current value of the row address XADD and/or the current value of the bank address BADD provided by the address decoder 110 when the refresh control circuitry 116 receives an indication of an activate command ACT. Continuing with this example, memory row addresses may be stored in a data storage unit of the refresh control circuitry 116. Thus, when a row address XADD and/or bank address BADD are sampled, the refresh control circuitry 116 may compare the sampled addresses XADD and/or BADD to the stored addresses in the data storage unit, and the comparison can be used to update a count value (e.g., an access or activate count) associated with a stored memory row address that matches the sampled addresses XADD and/or BADD. In turn, the refresh control circuitry 116 can identify an aggressor memory row address based on count values associated with the stored memory row addresses. When an aggressor memory row address is identified, the refresh control circuitry 116 can determine targeted refresh memory row addresses to output as refresh addresses RXADD to the row decoder 140.

As a specific example of determining targeted refresh addresses based on one or more signals of the memory device 100, the refresh control circuitry 116 may sample a current value of the row address XADD and a current value of the bank address BADD provided by the address decoder 110 when the refresh control circuitry 116 receives an indication of an activate command ACT from the command decoder 115. In turn, the refresh control circuitry 116 can update a counter value corresponding to the sampled addresses XADD and BADD using a corresponding one of the counters 121. The refresh control circuitry 116 can the compare (using the comparator(s) 124) the updated counter value to a current worst-case count stored in the worst-case count register 122. When the updated counter value exceeds the current worst-case count, the refresh control circuitry 116 can (a) replace the current worst-case count stored in the worst-case count register 122 with the updated counter value such that the updated counter value serves as a new worst-case count, and (b) replace the current worst-case memory row address stored in the worst-case address register 123 with a memory row address corresponding to the sampled addresses XADD and BADD. At a next RDR service event interval of the memory device, the refresh control circuitry 116 can identify the worst-case memory row address stored in the worst-case address register 123 as an aggressor memory row and can identify one or more memory rows neighboring the memory row corresponding to the worst-case memory row address, as victim memory rows. Thus, the refresh control circuitry 116 can output memory row addresses corresponding to the one or more neighboring memory rows as targeted refresh addresses RXADD for RDR service events. As discussed in greater detail below with reference to FIG. 3, the refresh control circuitry 116 can, in some embodimetns, refrain from outputting targeted refresh addresses RXADD for RDR service events when the worst-case count stored in the worst-case count register at the timing of an RDR service event interval of the memory device 100 is not greater than a threshold value.

Although targeted memory row address are discussed above as being identified by the refresh control circuitry 116 of the memory device, targeted memory row addresses may be supplied to the memory device 100 and/or to the refresh control circuitry 116 by a controller (e.g., the controller 101 of FIG. 1A) in some embodiments. For example, the memory controller 101 can issue a directed refresh management command to the memory device 100 that specifically identifies targeted memory row addresses. In turn, the refresh control circuitry 116 can output the specifically identified targeted memory row addresses as refresh addresses RXADD.

While in general the present disclosure refers to determining aggressor and victim wordlines and addresses, it should be understood that as used herein, an aggressor wordline does not necessarily need to cause data degradation in neighboring wordlines, and a victim wordline does not necessarily need to be subject to such degradation. The refresh control circuitry 116 may use some criteria to judge whether a memory row address is an aggressor memory row address, which may capture potential aggressor memory row addresses rather than definitively determining which memory row addresses correspond to memory rows that are causing data degradation in nearby victim memory rows. For example, the refresh control circuitry 116 may determine potential aggressor memory row addresses based on a pattern of accesses to the memory row addresses, and this criterion may include a memory row address that is not an aggressor, or may miss a memory row address that is an aggressor. Similarly, victim memory row addresses may be determined based on which wordlines are expected to be affected by aggressors, rather than a definitive determination of which wordlines are undergoing an increased rate of data decay.

The refresh address RXADD may be output by the refresh control circuitry 116 according to a timing that is based on activation timings of the refresh signal AREF. For example, upon each activation of the refresh signal AREF, the refresh control circuitry 116 may be afforded one or more time slots in which to output refresh addresses RXADD, and the refresh control circuitry 116 can output one or more refresh addresses RXADD during each time slot. In some embodiments, certain time slots may be reserved for targeted refresh addresses, and the refresh control circuitry 116 may determine whether to provide a targeted refresh address during the time slots, not provide an address during the time slots, or provide an auto-refresh address instead of a targeted refresh address during the time slots.

The refresh control circuitry 116 may use multiple methods to determine the timing of targeted refresh operations. For example, during a refresh mode of the memory device 100, the refresh control circuitry 116 can instruct the memory device 100 to perform auto-refresh operations and targeted refresh operations (e.g., by providing a targeted refresh address as the refresh address RXADD) based on a periodic schedule. As a specific example, after entering a refresh mode, the refresh control circuitry 116 can instruct the memory device 100 to perform a certain number of auto-refresh operations, and then instruct the memory device 100 to perform a certain number of targeted refresh operations.

The refresh control circuitry 116 may also respond to requested targeted refresh operations or requested panic targeted refresh operations that may be based on access patterns to a memory bank 152 or other region of memory. For example, the memory device 100 may receive refresh management commands (e.g., at the command/address terminals). In response, the command decoder 115 can provide a refresh management signal RFM (not shown) to the refresh control circuitry 116 based on the refresh management command. Responsive to activation of the refresh management signal RFM, the refresh control circuitry 116 may indicate that a panic targeted refresh operation should be performed. These panic targeted refresh operations may happen outside of a refresh period. For example, a high rate of accesses to a memory bank 152 may indicate that an attack is taking place, and the command decoder 115 and/or the refresh control circuitry 116 can count the access commands and instruct the memory device 100 to perform a panic targeted refresh operation once the count exceeds a threshold. As the number of panic targeted refresh operations increases, the refresh control circuitry 116 may decrease a number of periodic targeted refresh operations during the next refresh mode. It should be understood that the process of refreshing wordlines during a periodic and panic targeted refresh operation may generally be the same, and the difference may generally be in the timing of when the refreshes are performed.

FIG. 2 is a flow diagram illustrating a method 200 of operating a memory device and/or a memory system (e.g., a method of maintaining or tracking a worst-case memory row activation/access count) in accordance with various embodiments of the present technology. The method 200 is illustrated as a set of steps or blocks 201-206. All or a subset of one or more of the blocks 201-206 can be executed by components or devices of a memory system, such as the memory system 190 of FIG. 1A. For example, all or a subset of one or more of the blocks 201-206 can be executed by (i) one or more memory devices (e.g., one or more of the memory devices 100 of FIGS. 1A and 1B), (ii) refresh control circuitry (e.g., the refresh control circuitry 116 of FIG. 1B), (iii) row decoders (e.g., the row decoder 140 of FIG. 1B), (iv) command decoders (e.g., the command decoder 115 of FIG. 1B), (v) a memory controller (e.g., the memory controller 101 of FIG. 1A), and/or (vi) a host device (e.g., the host device 108 of FIG. 1A). Furthermore, any one or more of the blocks 201-206 can be executed in accordance with the discussion of FIGS. 1A and 1B above.

The method 200 begins at block 201 by detecting an activation of a memory row. The memory row can be a memory row of a memory array of the memory device. In some embodiments, detecting an activation of a memory row can include detecting an activate or access operation directed to the memory row. For example, detecting activation of a memory row can include receiving an indication of an activate command ACT (e.g., from a command decoder), receiving a corresponding memory row address XADD (e.g., from an address decoder), and/or receiving a corresponding bank address BADD (e.g., from the address decoder). In some embodiments, the activate command ACT, the corresponding memory row address XADD, and/or the corresponding bank address BADD can be received at refresh control circuitry of the memory device.

At block 202, the method 200 continues by incrementing a counter value corresponding to the memory row. The counter value can indicate a number of times the memory row has been activated or accessed (e.g., since a last auto-refresh or self-refresh of the memory row, since a last targeted refresh or targeted panic refresh of one or more memory rows neighboring the memory row that was performed based at least in part on the memory row being identified as an aggressor memory row, etc.). In some embodiments, incrementing the counter value can include incrementing the counter value using a counter corresponding to the memory row, such as a counter of the refresh control circuitry. In these and other embodiments, the method 200 can increment the counter value corresponding to the memory row based at least in part on receipt of the activate command ACT, the corresponding memory row address XADD, and/or the corresponding bank address BADD at block 201.

In some embodiments, the counter value can be incremented by one (1) each time the memory row is activated or accessed. In these and other embodiments, the counter value can be incremented by more than 1 (e.g., by two (2) or more) depending on the duration of time the memory row remains activated. For example, the counter value can be incremented by 1 when the memory row is activated, and can be incremented by more than 1 when the memory row is activated and remains activated for longer than a threshold period of time. Continuing with this example, the counter value can be incremented by 2 when the memory row remains activated for longer than a first threshold period of time (or longer than a first duration), and/or can be incremented by three (3) when the memory row remains activated for longer than a second threshold period of time (or longer than a second duration that is longer than the first duration). In some embodiments, the method 200 can determine the duration the memory row remains activated by tracking a period of time between the activate command ACT directed to the memory row (e.g., received at block 201) and a subsequent precharge command PRE directed to the memory row (e.g., received at the refresh control circuitry).

At block 203, the method 200 continues by comparing the incremented counter value to a worst-case memory row counter value ("a worst-case count value"). The worst-case count value can be stored by a worst-case memory row counter register ("a worst-case count register") of the memory device, such as a worst-case count register of the refresh control circuitry. In these embodiments, comparing the incremented counter value to the worst-case count value can include retrieving the worst-case count value from the worst-case count register (e.g., in response to incrementing the counter value at block 202 and/or based at least in part on receipt of the activate command ACT, the corresponding memory row address XADD, and/or the corresponding bank address BADD at block 201). In some embodiments, comparing the incremented counter value to the worst-case count value can include inputting the counter value and the worst-case count value into respective inputs of a comparator of the memory device, such as of the refresh control circuitry.

At block 204, the method 200 continues by determining whether the incremented counter value from block 202 is greater than the worst-case count value. The determination can be based at least in part on the comparison performed at block 203. In some embodiments, determining whether the counter value is greater than the worst-case count value can include determining whether the counter value is strictly greater than the worst-case count value. In other embodiments, determining whether the counter value is greater than the worst-case count value can include determining whether the counter value is greater than or equal to the worst-case count value.

As shown in FIG. 2, when the method 200 determines that the incremented counter value from block 202 is not greater than the worst-case count value (block 204: No), the method 200 can return to block 201 to detect a next activation of a memory row. The next activation of a memory row can be an activation of the same memory row discussed above with reference to blocks 201-204, or another memory row of the memory device. On the other hand, when the method 200 determines that the incremented counter value from block 202 is greater than the worst-case count value (block 204: Yes), the method 200 can proceed to block 205.

At block 205, the method 200 continues by updating the worst-case count value with the incremented counter value from block 202. In some embodiments, updating the worst-case count value with the incremented counter value includes setting the worst-case count value equal to the incremented counter value. In these and other embodiments, updating the worst-case count value with the incremented counter value can include storing the incremented counter value in the worst-case count register. For example, the current worst-case count value stored in the worst-case count register can be replaced with the incremented counter value such that the incremented counter value serves as a new worst-case count value.

At block 206, the method 200 continues by updating a worst-case memory row address with a memory row address corresponding to the memory row. For example, updating the worst-case memory row address can include updating the worst-case memory row address with a memory row address corresponding to the addresses XADD and/or BADD received at block 201. The worst-case memory row address can be stored by a worst-case memory row address register ("a worst-case address register") of the memory device, such as a worst-case address register of the refresh control circuitry. Continuing with this example, updating the worst-case memory row address with the memory row address corresponding to the memory row can include setting the worst-case memory row address equal to the memory row address corresponding to the memory row. In these and other embodiments, updating the worst-case memory row address with the memory row address corresponding to the memory row can include storing the memory row address corresponding to the memory row in the worst-case address register. For example, a current worst-case memory row address stored in the worst-case address register can be replaced with the memory row address corresponding to the memory row, such that the memory row address corresponding to the memory row serves as a new worst-case memory row address.

Although the blocks 201-206 of the method 200 are discussed and illustrated in a particular order, the method 200 illustrated in FIG. 2 is not so limited. In other embodiments, the method 200 can be performed in a different order. In these and other embodiments, any of the blocks 201-206 of the method 200 can be performed before, during, and/or after any of the other blocks 201-206 of the method 200. For example, block 206 can be performed before and/or during block 205. Moreover, a person of ordinary skill in the relevant art will recognize that the illustrated method 200 can be altered and still remain within these and other embodiments of the present technology. For example, one or more blocks 201-206 of the method 200 illustrated in FIG. 2 can be omitted and/or repeated in some embodiments.

Figure 3:
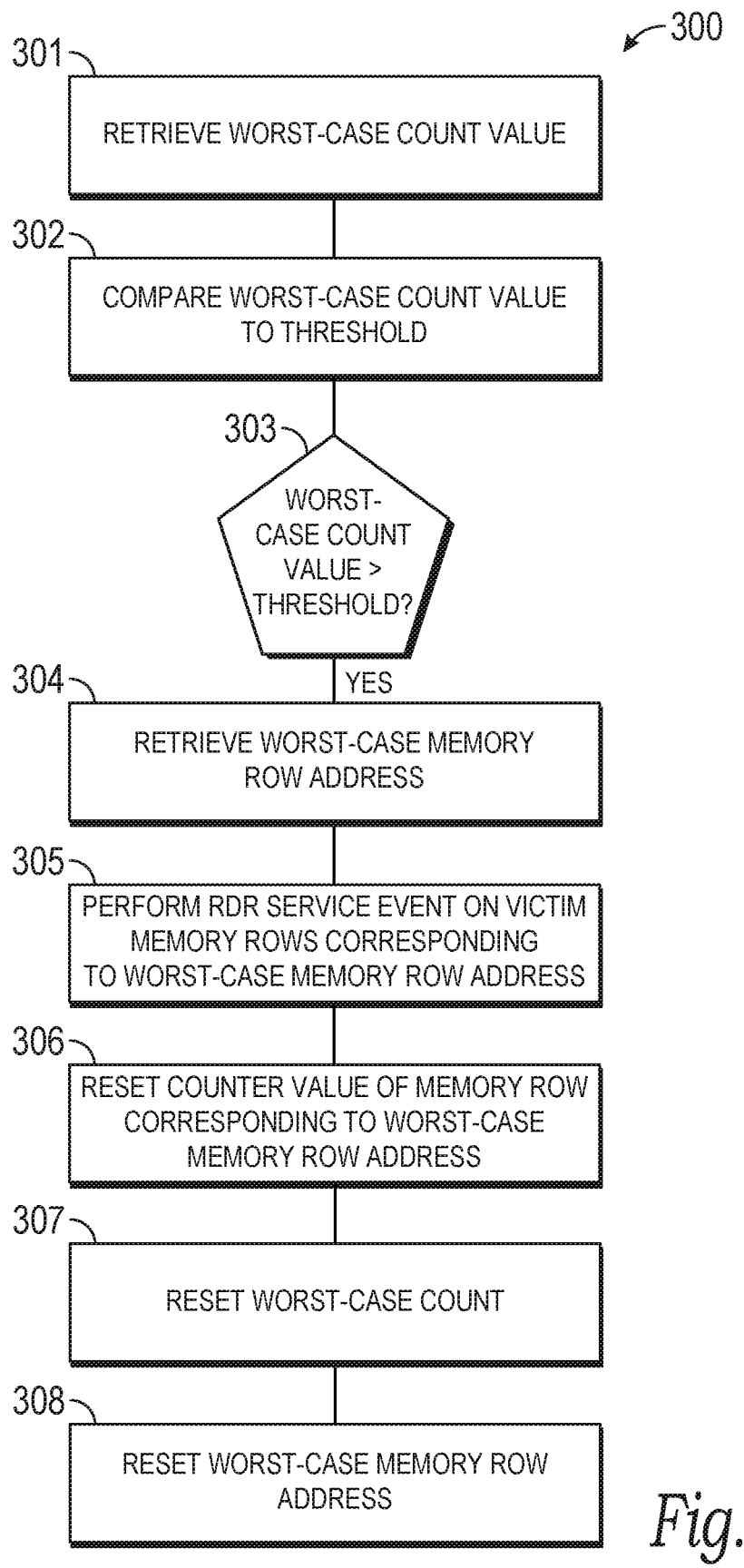
FIG. 3 is a flow diagram illustrating another method of operating a memory device in accordance with various embodiments of the present technology.

FIG. 3 is a flow diagram illustrating a method 300 of operating a memory device and/or a memory system (e.g., a method of performing a row disturb refresh (RDR) service event) in accordance with various embodiments of the present technology. The method 300 is illustrated as a set of steps or blocks 301-308. All or a subset of one or more of the blocks 301-308 can be executed by components or devices of a memory system, such as the memory system 190 of FIG. 1A. For example, all or a subset of one or more of the blocks 301-308 can be executed by (i) one or more memory devices (e.g., one or more of the memory devices 100 of FIGS. 1A and 1B), (ii) refresh control circuitry (e.g., the refresh control circuitry 116 of FIG. 1B), (iii) row decoders (e.g., the row decoder 140 of FIG. 1B), (iv) command decoders (e.g., the command decoder 115 of FIG. 1B), (v) a memory controller (e.g., the memory controller 101 of FIG. 1A), and/or (vi) a host device (e.g., the host device 108 of FIG. 1A). Furthermore, any one or more of the blocks 301-308 can be executed in accordance with the discussion of FIGS. 1A-2 above.

The method 300 begins at block 301 by retrieving a worst-case memory row counter value ("a worst-case count value"). As discussed above, the worst-case count value can correspond to a memory row referenced by a worst-case memory row address (e.g., stored in a worst-case memory row address register of the refresh control circuitry). In some embodiments, the method 300 can retrieve the worst-case count value during or in anticipation of an RDR service event interval of the memory device. In embodiments in which the worst-case count value is stored by a worst-case memory row counter register ("a worst-case count register") of the memory device (e.g., of refresh control circuitry of the memory device), retrieving the worst-case count value can include retrieving a worst-case count value currently stored in the worst-case count register.

At block 302, the method 300 continues by comparing the worst-case count value to a threshold. The threshold can represent (a) a threshold number of activations of a memory row, (b) a duration the memory row is held activated, or (c) a combination thereof. In some embodiments, the threshold can be set at a level at or beyond which activation of a memory row poses a data security risk to one or more memory rows neighboring the memory row. Stated another way, the threshold can be set at a level at or below which activation of a memory row poses little to no data security risk to one or more memory rows neighboring the memory row. In some embodiments, comparing the worst-case count value to the threshold can include inputting the worst-case count value and the threshold into respective inputs of a comparator of the memory device (e.g., of the refresh control circuitry).

At block 303, the method 300 continues by determining whether the worst-case count value is greater than the threshold. The determination can be based at least in part on the comparison performed at block 302. In some embodiments, determining whether the worst-case count value is greater than the threshold can include determining whether the worst-case count value is strictly greater than the threshold. In other embodiments, determining whether the worst-case count value is greater than the threshold can include determining whether the worst-case count value is greater than or equal to the threshold.

As shown in FIG. 3, when the method 300 determines that the worst-case count value is not greater than the threshold (block 303: No), the method 300 can end. In other words, the method can skip performing an RDR service event (e.g., refrain from performing a targeted refresh operation) when the worst-case count value is not greater than the threshold. On the other hand, when the method 300 determines that the worst-case count value is greater than the threshold (block 303: Yes), the method 300 can proceed to block 304.

At block 304, the method 300 continues by retrieving a worst-case memory row address for performing an RDR service event. As discussed above, the worst-case memory row address can be stored by a worst-case memory row address register ("a worst-case address register") of the memory device. In these embodiments, retrieving the worst-case memory row address can include retrieving a worst-case memory row address currently stored in the worst-case address register.

At block 305, the method 300 continues by performing the RDR service event on one or more memory rows neighboring the memory row corresponding to the worst-case memory row address. For example, a memory row corresponding to the worst-case memory row address can be identified as an aggressor memory row at blocks 304 and/or 305. Continuing with this example, performing the RDR service event on one or more neighboring memory rows can include identifying one or more victim memory rows neighboring the aggressor memory row. The one or more victim memory rows can include memory rows physically and/or logically adjacent the aggressor memory row, such as (a) one or more victim memory rows immediately physically adjacent and/or immediately logically adjacent the aggressor memory row and/or (b) one or more victim memory rows physically and/or logically positioned within a threshold number of memory rows in one or more directions from the aggressor memory row. In these and other embodiments, performing the RDR service event can include refreshing the one or more neighboring memory rows, such as by performing a targeted refresh and/or a targeted panic refresh on the one or more neighboring memory rows.

At block 306, the method 300 continues by resetting a counter value of the memory row corresponding to the worst-case memory row address. As discussed above, in some embodiments, the counter value can be maintained and/or managed (e.g., incremented) by a counter corresponding to the memory row, such as a counter of the refresh control circuitry. In these embodiments, resetting the counter value can include resetting the counter. In these and other embodiments, resetting the counter value can include resetting the counter value to zero (0) or to another default value (e.g., a null or indeterminate value).

At block 307, the method 300 continues by resetting the worst-case count value. In embodiments in which the worst-case count value is stored by a worst-case count register, resetting the worst-case count value can include resetting the worst-case count register. In these and other embodiments, resetting the worst-case count value can include resetting the worst-case count value to zero (0) or to another default value (e.g., a null or indeterminate value).

At block 308, the method 300 continues by resetting the worst-case memory row address. In embodiments in which the worst-case memory row address is stored by a worst-case address register, resetting the worst-case memory row address can include resetting the worst-case address register. In these and other embodiments, resetting the worst-case memory row address can include resetting the worst-case memory row address to a default value, such as a default memory row address or a null/indeterminate memory row address.

Although the blocks 301-308 of the method 300 are discussed and illustrated in a particular order, the method 300 illustrated in FIG. 3 is not so limited. In other embodiments, the method 300 can be performed in a different order. In these and other embodiments, any of the blocks 301-308 of the method 300 can be performed before, during, and/or after any of the other blocks 301-308 of the method 300. For example, block 304 can be performed before, during, or after one or more of the blocks 301-303. As another example, two or more of the blocks 306-308 can be performed in any order and/or simultaneously.

Moreover, a person of ordinary skill in the relevant art will recognize that the illustrated method 300 can be altered and still remain within these and other embodiments of the present technology. For example, one or more blocks 301-308 of the method 300 illustrated in FIG. 3 can be omitted and/or repeated in some embodiments. As a specific example, blocks 301-303 can be omitted in some embodiments. In these embodiments, the method can perform an RDR service event on one or more memory rows neighboring the memory row corresponding to the worst-case memory row address regardless of the magnitude of the worst-case count value at the time of the RDR service event interval. Thus, in these embodiments, the method 300 can start at block 304.

As another example, block 306 of the method 300 can be omitted in some embodiments. For example, even though an RDR service event is performed at block 305 on one or more memory rows neighboring the memory row corresponding to the worst-case memory row address, the method 300 can retain the counter value corresponding to the memory row such that the one or more neighboring memory rows continue to be refreshed (e.g., via targeted refresh operations) when the memory row corresponding to the worst-case memory row address is again or repeatedly activated following execution of the RDR service event. In these and other embodiments, the counter value corresponding to the memory row can be reset (a) randomly, (b) after a threshold amount of time has elapsed since a last activation of the memory row, (c) upon execution of an auto-refresh operation (e.g., a standard refresh) on the memory row, and/or (d) upon the occurrence of one or more other events.

As still another example, block 308 of the method 300 can be omitted in some embodiments such that a second, subsequent iteration of the method 300 uses the same worst-case memory row address stored in the worst-case memory row address register that was used in a first iteration of the method 300 unless the worst-case memory row address register is updated with a new worst-case memory row address (block 206 of FIG. 2) between the first and second iterations of the method 300.

Figure 4:
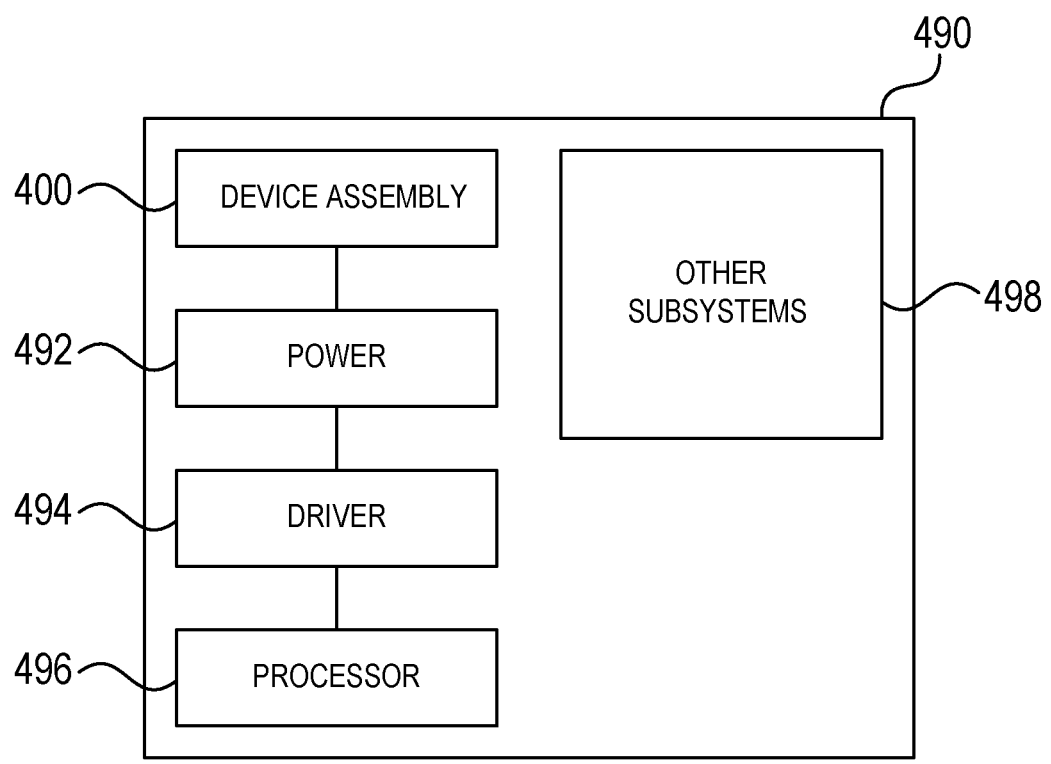
FIG. 4 is a block diagram of a system having a memory device configured in accordance with various embodiments of the present technology.

Any of the foregoing memory systems, devices, and/or methods described above with reference to FIGS. 1A-3 can be incorporated into any of a myriad of larger and/or more complex systems, a representative example of which is system 490 shown schematically in FIG. 4. The system 490 can include a semiconductor device assembly 400, a power source 492, a driver 494, a processor 496, and/or other subsystems and components 498. The semiconductor device assembly 400 can include features generally similar to those of the memory systems, devices, and/or methods described above with reference to FIGS. 1A-3. The resulting system 490 can perform any of a wide variety of functions, such as memory storage, data processing, and/or other suitable functions. Accordingly, representative systems 490 can include, without limitation, hand-held devices (e.g., mobile phones, tablets, digital readers, and digital audio players), computers, vehicles, appliances, and other products. Components of the system 490 may be housed in a single unit or distributed over multiple, interconnected units (e.g., through a communications network). The components of the system 490 can also include remote devices and any of a wide variety of computer readable media.

As used herein, the terms "memory system" and "memory device" refer to systems and devices configured to temporarily and/or permanently store information related to various electronic devices. Accordingly, the term "memory device" can refer to a single memory die and/or to a memory package containing one or more memory dies. Similarly, the term "memory system" can refer to a system including one or more memory dies (e.g., a memory package) and/or to a system (e.g., a dual in-line memory module (DIMM)) including one or more memory packages.

Where the context permits, singular or plural terms can also include the plural or singular term, respectively. In addition, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Furthermore, as used herein, the phrase "and/or" as in "A and/or B" refers to A alone, B alone, and both A and B. Additionally, the terms "comprising," "including," "having" and "with" are used throughout to mean including at least the recited feature(s) such that any greater number of the same feature and/or additional types of other features are not precluded. Moreover, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; it will be understood by a person of ordinary skill in the art, however, that the signal may represent a bus of signals, where the bus may have a variety of bit widths.

The functions described herein may be implemented in hardware, software executed by a processor, firmware, or any combination thereof. Other examples and implementations are within the scope of the disclosure and appended claims. Features implementing functions may also be physically located at various positions, including being distributed such that portions of functions are implemented at different physical locations.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented and/or discussed in a given order, alternative embodiments can perform steps in a different order. Furthermore, the various embodiments described herein can also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. From the foregoing, it will also be appreciated that various modifications can be made without deviating from the technology. For example, various components of the technology can be further divided into subcomponents, or that various components and functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the technology. Accordingly, the disclosure and associated technology can encompass other embodiments not expressly shown or described herein. To the extent any materials incorporated herein by reference conflict with the present disclosure, the present disclosure controls.

What is claimed is:

1. A method of operating a memory device, comprising:
in response to detecting activation of a memory row of the memory device, updating a counter value maintained by a counter corresponding to the memory row, wherein the counter is one of a plurality of counters, each counter of the plurality corresponds to a respective memory row of the memory device, and each counter of the plurality maintaining a counter value tracking a number of activations of the respective memory row;
comparing the updated counter value to a worst-case count value; and
in response to determining that the updated counter value is greater than the worst-case count value—
setting the worst-case count value equal to the updated counter value, and
storing a memory row address of the memory row as a worst-case memory row address.

2. The method of claim 1, further comprising performing a row disturb refresh operation based at least in part on the worst-case memory row address.

3. The method of claim 2, wherein performing the row disturb refresh operation includes:
identifying, based at least in part on the worst-case memory row address, memory row addresses corresponding to one or more memory rows neighboring the memory row corresponding to the worst-case memory row address; and
refreshing the one or more memory rows based at least in part on the identified memory row addresses.

4. The method of claim 2, wherein performing the row disturb refresh operation includes performing the row disturb refresh operation in response to a determination that the worst-case count value is greater than a threshold value.

5. The method of claim 2, wherein:
the method further comprises, before performing the row disturb refresh operation—
updating, in response to detecting activation of another memory row of the memory device, another counter value maintained by another counter of the plurality of counters, the other counter corresponding to the other memory row,
after updating the other counter value—
comparing the other counter value to the worst-case count value corresponding to the updated counter value, and in response to determining that the other counter value is greater than the worst-case count value corresponding to the updated counter value, (a) setting the worst-case count value equal to the other counter value and (b) storing a memory row address of the other memory row as the worst-case memory row address; and performing the row disturb refresh operation includes performing the row disturb refresh operation on one or more memory rows neighboring the other memory row corresponding to the worst-case memory row address.

6. The method of claim 2, wherein:

the method further comprises, before performing the row disturb refresh operation—
updating, in response to detecting activation of another memory row of the memory device, another counter value maintained by another counter of the plurality of counters, the other counter corresponding to the other memory row,
after updating the other counter value—
comparing the other counter value to the worst-case count value corresponding to the updated counter value, and
in response to determining that the other counter value is less than the worst-case count value corresponding to the updated counter value, leaving (a) the worst-case count value equal to the updated counter value and (b) the worst-case memory row address as the memory row address of the memory row; and performing the row disturb refresh operation includes performing the row disturb refresh operation on one or more memory rows neighboring the memory row corresponding to the worst-case memory row address.

7. The method of claim 2, further comprising:
resetting the updated counter value to a first default value based at least in part on performing the row disturb refresh event;
resetting the worst-case count value to a second default value based at least in part on performing the row disturb refresh event;
resetting the worst-case memory row address to a third default value based at least in part on performing the row disturb refresh event; or
any combination thereof.

8. The method of claim 1, wherein setting the worst-case count value equal to the updated counter value includes updating the worst-case count value stored to a worst-case count register of the memory device.

9. The method of claim 1, wherein storing the memory row address includes replacing another worst case-memory row address stored in a worst-case address register with the worst-case memory row address.

10. The method of claim 1, wherein updating the counter value includes:
determining a duration of time that the memory row remains activated; and
incrementing the counter value by (a) a first amount in response to determining that the duration of time is less than a threshold amount of time or (b) a second amount in response to determining that the duration of time is greater than the threshold amount of time, wherein the second amount is greater than the first amount.

11. The method of claim 10, wherein determining the duration of time includes determining an amount of time that elapses between an activate command directed to the memory row and a precharge command subsequently directed to the memory row.

12. A memory device, comprising:
a memory array including a plurality of memory rows; and
refresh control circuitry including—
a plurality of counters, each counter of the plurality dedicated to a unique memory row of the plurality of memory rows and configured to maintain a respective counter value representative of a number of activations of a respective memory row,
a worst-case count register configured to store a worst-case count value representative of a worst-case counter value of counter values maintained by the plurality of counters, and
a worst-case address register configured to store a worst-case memory row address of a memory row of the plurality of memory rows that corresponds to the worst-case count value,
wherein the memory device is configured, during a row disturb refresh interval of the memory device, to perform a row disturb refresh operation based at least in part on the worst-case memory row address.

13. The memory device of claim 12, wherein:
the refresh control circuitry includes only one worst-case count register; and
the worst-case count register is configured to store only one worst-case count.

14. The memory device of claim 12, wherein:
the refresh control circuitry includes only one worst-case address register; and
the worst-case address register is configured to store only one worst-case memory row address.

15. The memory device of claim 12, wherein a first counter of the plurality of counters is configured, in response to detecting activation of a first memory row of the plurality of memory rows corresponding to the first counter, to update a first counter value to reflect the activation of the first memory row.

16. The memory device of claim 15, wherein, to update the first counter value, the first counter is configured to:
increment the first counter value by a first amount when a duration of time that the first memory row remains activated is less than a threshold amount of time; and
increment the first counter value by a second amount greater than the first amount when the duration of time is greater than the threshold amount of time.

17. The memory device of claim 12, wherein:
the refresh control circuitry includes a comparator configured, when a counter of the plurality of counters updates a corresponding counter value, to compare the corresponding counter value to the worst-case count value stored in the worst-case count register; and
the refresh control circuitry is configured, in response to a determination that the corresponding counter value is greater than the worst-case count value, to:
store the corresponding counter value in the worst-case count register such that the worst-case count value is replaced with the corresponding counter value, and
store a memory row address of a first memory row of the plurality of memory rows corresponding to the corresponding counter value to the worst-case address register as the worst-case memory row address.

18. The memory device of claim 12, wherein:
the refresh control circuitry is configured to identify one or more memory row addresses corresponding to one or more memory rows neighboring the memory row corresponding to the worst-case memory row address stored to the worst-case address register; and
to perform the row disturb refresh operation, the memory device is configured to refresh the one or more memory rows based at least in part on the one or more memory row addresses identified by the refresh control circuitry.

19. The memory device of claim 12, wherein the refresh control circuitry is configured, based at least in part on the memory device performing the row disturb refresh operation, to reset (a) the worst-case count value to a first default value, (b) reset the worst-case memory row address to a second default value, (c) reset a counter value that is maintained by a counter of the plurality of counters and that corresponds to the worst-case count value, or (d) any combination thereof.

20. Refresh control circuitry for controlling row disturb refresh operations of a memory device, the refresh control circuitry comprising:
a plurality of counters, each counter configured to maintain a respective counter value representative of a number of activations of a unique memory row of the memory device;
a worst-case count register configured to store a single worst-case count value representative of a worst-case counter value maintained by the plurality of counters;
a worst-case address register configured to store a single worst-case memory row address of a memory row that corresponds to the single worst-case count value; and
a comparator configured, when a counter of the plurality of counters updates a corresponding counter value, to compare the corresponding counter value to the single worst-case count value stored in the worst-case count register,
wherein the refresh control circuitry is configured, in response to a determination that the corresponding counter value is greater than the single worst-case count value, to:
store the corresponding counter value in the worst-case count register such that the single worst-case count value is replaced with the corresponding counter value, and
store a memory row address of a first memory row corresponding to the corresponding counter value to the worst-case address register as the single worst-case memory row address.

\* \* \* \* \*